(12) United States Patent
Seger et al.

(10) Patent No.: US 8,544,631 B2
(45) Date of Patent: Oct. 1, 2013

(54) APPARATUS AND METHOD FOR DISTRIBUTING ARTICLES WITHIN A STREAM OF ARTICLES

(75) Inventors: Martin Seger, Neumarkt (DE); Stefan Heigl, Aholfing (DE); Johann Huettner, Mallersdorf-Pfaffenberg (DE); Peter Muehlstein, Koefering (DE)

(73) Assignee: Krones AG, Neutraubling (DE)

(*) Notice: Subject to any disclaimer, the term of this patent is extended or adjusted under 35 U.S.C. 154(b) by 154 days.

(21) Appl. No.: 13/035,410

(22) Filed: Feb. 25, 2011

(65) Prior Publication Data

US 2011/0220460 A1  Sep. 15, 2011

(30) Foreign Application Priority Data

Mar. 9, 2010  (DE) .................. 10 2010 015 888

(51) Int. Cl.
*B65G 47/26* (2006.01)
(52) U.S. Cl.
USPC .......................................... 198/442; 198/452
(58) Field of Classification Search
USPC ............................ 198/442, 443, 452, 456, 367
See application file for complete search history.

(56) References Cited

U.S. PATENT DOCUMENTS

| | | | | |
|---|---|---|---|---|
| 3,599,789 A * | 8/1971 | Kurczak | .................. | 198/442 |
| 5,186,306 A * | 2/1993 | Sjostrand | .................. | 198/442 |
| 5,441,142 A * | 8/1995 | Schneider | .................. | 198/442 |
| 5,582,284 A * | 12/1996 | Calladine et al. | .................. | 198/367 |
| 5,787,679 A * | 8/1998 | Lynch et al. | .................. | 198/442 |
| 5,988,356 A * | 11/1999 | Bonnet | .................. | 198/598 |
| 7,165,667 B2 * | 1/2007 | Bocker et al. | .................. | 198/442 |
| 7,380,650 B2 * | 6/2008 | Gamberini | .................. | 198/432 |
| 2009/0259334 A1 * | 10/2009 | Seger et al. | .................. | 414/754 |

FOREIGN PATENT DOCUMENTS

| | | |
|---|---|---|
| EP | 0429803 A1 | 6/1991 |
| EP | 0619251 A1 | 10/1994 |
| EP | 0585685 B1 | 1/1996 |
| EP | 1424297 B1 | 12/2005 |
| EP | 1681249 A1 | 7/2006 |
| EP | 1807329 B1 | 5/2008 |
| EP | 2110346 A1 | 10/2009 |

* cited by examiner

*Primary Examiner* — James R Bidwell
(74) *Attorney, Agent, or Firm* — Patentbar International P.C.

(57) ABSTRACT

An apparatus (1) and a method for distributing articles (10) within a stream of articles are disclosed. Articles (10) are supplied by an infeed conveyor (2). A first discharge conveyor (21) and a second discharge conveyor (22) further transport the articles. The infeed conveyor (2) and the first and second discharge conveyors (21, 22) are arranged in the direction of transport (T) with respect to each other in such a way that a region of overlap (15) is formed. A distribution element (4) is configured such as to be displaceable essentially transversely to the direction of transport (T), so that the stream of articles, incoming along the direction of transport (T), is distributed onto the first discharge conveyor (21) and/or the second discharge conveyor (22).

14 Claims, 11 Drawing Sheets

APPARATUS AND METHOD FOR DISTRIBUTING ARTICLES WITHIN A STREAM OF ARTICLES

CROSS REFERENCE TO RELATED APPLICATIONS

This Utility patent application claims priority of German Patent Application No. DE 10 2010 015 888.7, filed on Mar. 9, 2010, that is incorporated herein by reference in its entirety.

FIELD OF THE INVENTION

The present invention relates to an apparatus for distributing articles within a stream of articles in a direction of transport.

Furthermore the invention relates to a method for distributing articles within a stream of articles.

BACKGROUND OF THE INVENTION

The European patent EP 1 424 297 B1 discloses an apparatus for separating a stream of containers. The apparatus for separating and dividing streams of articles comprises at least one container infeed, exhibiting at least two infeed conveyors. A guiding element is located in the stream of containers. In the vicinity of the guiding element the conveyors are directed such that they separate and divide the stream of articles. As a gap between the infeed conveyors forms due to the separation of the conveyors, this is covered by at least one slide plate. Within the separation a redirecting station for the containers is provided.

The European patent EP 1 807 329 B1 discloses an apparatus for buffering objects. The apparatus for buffering objects exhibits two parallel conveyors, configured to be driven in opposite directions. In order to be able to configure the buffer variably, at least one displaceable transfer device is provided by means of at least one linear guide along the conveyors, which serves to transfer the objects between the two conveyors arranged in parallel. This linear guide is arranged at a distance above the conveyors. The linear guide is located approximately centrally above one conveyor and the other linear guide is located approximately centrally above the other conveyor.

The European patent application EP 2 110 346 A1 discloses an apparatus and a method for the transport and the synchronous distribution of containers. The containers are continuously provided on a transport apparatus and are distributed to two further transport apparatuses. The containers are centered on the first transport apparatus by means of two flaps, wherein the motion of the flaps is coupled mechanically.

The European patent EP 0 585 685 B1 discloses an apparatus for transferring a stream of containers coming in in one row in one lane to plural discharge conveyor lanes. The transfer of the stream of containers is effected by means of a switching point serving as a sliding surface and the upstream end of which, directed towards the stream of containers coming in in one lane, is displaceable essentially transverse to the direction of transport. The switching point, at least in sections, is elastically deformable. Its downstream end is displaceably fixed or guided transversely to the direction of transport.

The European patent application EP 0 619 251 A1 discloses an apparatus for the transport of containers, wherein the containers coming in on one transport lane can be distributed in a controlled fashion on plural discharge lanes. In order to distribute the containers in a defined fashion to the discharge lanes, the containers are arranged in rows of a corresponding number of containers already on the incoming transport lane, which eventually are directed onto the discharge lanes. With the apparatus described it is also possible to redirect individual discharge lanes by means of switching points.

SUMMARY OF THE INVENTION

It is an object of the invention to provide an apparatus with which it is possible to distribute an incoming stream of containers to two discharged streams of containers in a simple and very variable fashion. Furthermore the distribution of the stream of containers should be automatic and it should be possible to adapt it to various shapes and sizes of containers.

The above object is achieved by an apparatus for distributing articles within a stream of articles in a direction of transport, comprising:
- an infeed conveyor exhibiting plural conveyor lanes;
- a first discharge conveyor and a second discharge conveyor, each exhibiting plural conveyor lanes;
- a region of overlap is formed by the arrangement of the infeed conveyor and the first and second discharge conveyor in the direction of transport; and
- a distribution element is displaceable essentially transverse to the direction of transport, so that a stream of incoming articles is distributed onto the first discharge conveyor and/or the second discharge conveyor, in the direction of transport.

A further object of the invention is to provide a method for automatically distributing a stream of containers to two discharged streams of containers in as simple as possible a manner. Additionally, the method should react as far as possible automatically to occurring disturbances.

The above object is achieved by a method for distributing articles within a stream of articles, comprising the steps of:
- supplying articles in a direction of transport by an infeed conveyor; and
- distributing the articles onto a first discharge conveyor and a second discharge conveyor, by displacing a distribution element transversely to the direction of transport of the articles, wherein the articles are distributed onto the first and second discharge conveyors according to a predefined percental ratio.

As described in the state of the art, the distribution of containers from one multi-lane to two multi-lane conveyors is effected essentially by systems of flaps operated manually, pneumatically, or by a motor. If flaps are used, only one destination conveyor can be delivered to. The flaps may be removed, then, however, the rigid triangular guiding rail behind distributes the incoming containers with a fixed ratio. This ratio in most cases is such that 50% of the containers are distributed to one of the discharge conveyors and 50% of the containers are distributed to the other discharge conveyor. Furthermore, for switching the flap the infeed conveyor has to be free of containers.

In the embodiment of the invention a triangular distribution element operated by a motor is used. The distribution element therein is arranged and configured such as to be displaceable transversely to a direction of transport of the infeed conveyor. The distribution element according to the invention is hanging from a portal. The distribution element can be displaced continuously transversely to the conveyor by the drive system. Thus it is possible for the two discharge conveyors to be supplied with arbitrary subsets of the rows of containers on the infeed conveyor. It must be assured, however, that only integer quantities of containers are distributed. Furthermore switching is also possible during operation, as long as the safety light barriers on the discharge conveyors do not report a congestion.

In case a congestion is reported on one of the discharge conveyors, it is also possible to dynamically redirect the entire stream of containers onto the other discharge conveyor, even during operation. A congestion for example can occur, if a processing machine downstream of the apparatus displays or reports an error message, and thus no longer is available for processing the containers supplied to it. The distribution element according to the invention can also be integrated into the congestion control as an additional active element, in order to preempt congestions by suitable variation of the distribution of the containers onto the two discharge conveyors.

The apparatus for distributing articles within a stream of articles according to the invention, wherein the articles are supplied along a direction of transport on an infeed conveyor, comprises a distribution element. The infeed conveyor may comprise plural conveyor lanes. To the infeed conveyor there correspond a first discharge conveyor and a second discharge conveyor. Each of the discharge conveyors exhibits plural transport lanes. The infeed conveyor and the first and second discharge conveyors are arranged in the direction of transport in such a way with respect to each other that a region of overlap between the conveyors is formed. A distribution element therein is configured such as to be displaceable essentially transversely to the direction of transport, so that the stream of articles, incoming along the direction of transport, can be distributed onto the first and/or the second discharge conveyor variably and changeably in time.

The distribution element therein consists of a first guiding rail and a second guiding rail. The guiding rails are arranged at an acute angle with respect to each other. The acute angle thus forms a cone end, which is directed opposite the direction of transport. The containers supplied on the infeed conveyor thus move towards the cone end of the distribution element and are directed onto the first discharge conveyor and the second discharge conveyor by the first and second guiding rails, respectively. The percental ratio of the containers directed onto the first conveyor and onto the second conveyor depends essentially on the position of the distribution element in the incoming stream of articles. This position discretely can be any position between the end switches and only depends on the driving means selected and a possible corresponding gear ratio.

The first guiding rail and the second guiding rail of the distribution element are connected with each other by a base. The base therein is supported on a guiding element downstream the direction of transport, which for example comprises bearing-mounted rollers. Thus the distribution element is supported in a friction reduced fashion on the guiding element transversely to the direction of transport. The base of the distribution element and the guiding element therein cooperate through plural rollers transversely to the direction of transport, in order to thus provide the friction reduced support.

The distribution element is connected with a platform. The platform is hanging from a portal. The portal extends across the region of overlap of the infeed conveyor and the first and second discharge conveyor.

To the portal there corresponds an individually controllable motor. The rotary motion of the motor through a drive belt acts on the platform guided linearly on the portal. Furthermore the portal exhibits two end switches, by which a range of displacement of the distribution element transverse to the direction of transport can be restricted.

The width of the infeed conveyor and the width of the discharge conveyors are related to each other according to the invention. The sum of the first width of the first discharge conveyor and the width of the second discharge conveyor therein is larger than the width of the infeed conveyor. It is particularly advantageous for the invention if the width of the first discharge conveyor, and the width of the second discharge conveyor, as well as the width of the infeed conveyor are equal.

The apparatus according to the invention is further provided with a machine control. In dependence on the articles processed with the apparatus according to the invention a percental distribution of the articles onto the first and second discharge conveyor is achieved by the machine control. This is achieved by moving the distribution element across the portal transversely to the direction of transport by the motor. By the machine control therein the cone end formed by the first and second guiding rail is essentially directed to a line resulting from the contact of the respective effective diameters of two articles. By this positioning of the distribution element by means of the machine control it is achieved that all incoming articles are distributed onto the first discharge conveyor and onto the second discharge conveyor. A possible congestion thus is avoided, as the articles do not make contact with the cone end of the distribution element with their entire diameter. All articles thus are directed onto the first discharge conveyor and onto the second discharge conveyor, respectively, by the distribution element.

The method according to the invention is suitable for distributing an incoming stream of articles onto a first discharge conveyor and a second discharge conveyor by means of a distribution element. The distribution element, in order to achieve a variable distribution of the articles supplied on an infeed conveyor, is displaceable transversely to the direction of transport of the incoming articles. By the arbitrary positioning of the distribution element within the incoming stream of articles it thus is possible to distribute the articles onto the first and second discharge conveyors according to a predefined percental ratio.

By means of the distribution element the articles supplied on the infeed conveyor are transferred into a first transport area of the first discharge conveyor and into a second transport area of the second discharge conveyor. In dependence on the position of the distribution element areas free of articles are formed in a region of overlap of the infeed conveyor and of the two discharge conveyors essentially next to the distribution element and in the direction of transport after the distribution element.

In order to distribute the articles particularly carefully onto the first conveyor and onto the second conveyor, the distribution element consists of a first and a second guiding rail, connected with each other such as to enclose an acute angle and thus forming a cone end. The cone end therein is directed against the direction of transport of the articles, which are supplied on the fist conveyor.

A processing unit for the articles is located downstream of the first discharge conveyor. Likewise a processing unit for the articles is located downstream of the second discharge conveyor. The machine control can receive corresponding signals from the first and the second processing unit indicating a possible disturbance or a possible limit of capacity of the downstream processing unit. Furthermore plural sensors are provided which monitor the infeed conveyor, the first discharge conveyor and the second discharge conveyor with respect to the transport situation of the articles on the individual conveyors. If, for example, a congestion is detected by the sensors based on the transport situation, the sensors send corresponding signals to the machine control.

Also the areas free of articles are monitored by the plural sensors with regard to whether there are articles in the areas otherwise free of articles. The presence of articles in the areas free of articles indicates that there is a congestion within the apparatus on the individual conveyors or that the downstream processing units cannot cope with the stream of articles supplied on the first or second discharge conveyor. Due to the warning signal sent to the machine control from the sensors, the machine control steps in in the apparatus and assures a suitable displacement of the distribution element. Due to a suitable position of the distribution element the stream of articles can thus be suitably redirected onto the other discharge conveyor not affected by a congestion, so that further operation of the apparatus is possible. Also the machine control, due to the warning signal, can step in in a velocity control of the infeed conveyor and/or of the two discharge conveyors, so that eventually the cause for sending the warning signal can be eliminated.

BRIEF DESCRIPTION OF THE DRAWINGS

In what follows embodiments shall illustrate the invention and its advantages with reference to the accompanying figures. The size ratios between the individual elements in the figures do not always correspond to the real size ratios, as some shapes are shown simplified and other shapes enlarged with respect to other elements for better illustration.

DETAILED DESCRIPTION OF THE INVENTION

Figure 1:
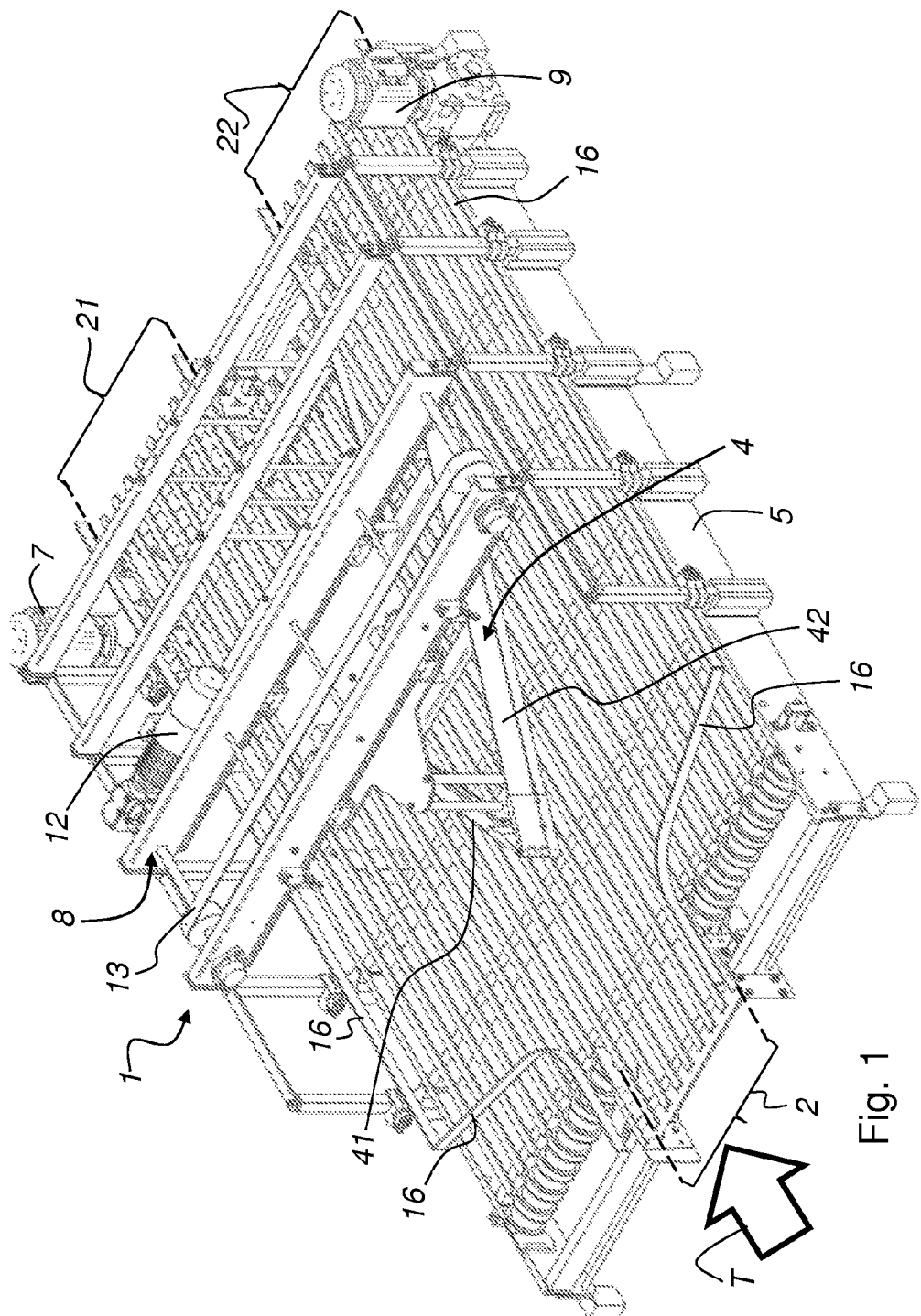
FIG. 1 shows a perspective view of the apparatus according to the invention, which consists of an infeed conveyor, a first discharge conveyor and a second discharge conveyor.

Identical reference numerals are used for like elements of the invention or elements of like function. Furthermore, for the sake of clarity only those reference numerals are shown in the individual figures, which are required for the description of the respective figure. The embodiments shown are only examples of how the apparatus according to the invention and the method according to the invention may be realized, and do not constitute a limitation.

FIG. 1 shows a perspective view of the apparatus 1 according to the invention. The apparatus 1 is composed of an infeed conveyor 2 and a first discharge conveyor 21 and a second discharge conveyor 22. The conveyors 2, 21, and 22 are placed in a frame 5. To the infeed conveyor 2 there correspond a first motor 7 and a second motor 9. It is also conceivable that only one motor is provided for driving the infeed conveyor 2. If only one motor is used this serves the reduction of costs for the apparatus 1 for the transport of articles. The articles (not shown here) are supplied in the direction of transport T on the infeed conveyor 2. A distribution element 4 is arranged transversely to the direction of transport T such as to be movable. The distribution element 4 is hinged to a portal 8, which extends transversely across the transport surface defined by the infeed conveyor, the first discharge conveyor 21 and the second discharge conveyor 22. The transport surface defined by the infeed conveyor 2, the first discharge conveyor 21 and the second discharge conveyor 22 is limited laterally by correspondingly shaped rails 16. The distribution element 4 consists of a first guiding rail 41 and a second guiding rail 42. The articles supplied in the direction of transport T on the infeed conveyor 2 are distributed to the first discharge conveyor 21 and to the second discharge conveyor 22 in a corresponding fashion by the first guiding rail 41 and the second guiding rail 42 of the distribution element 4. The percental distribution of the articles to the first discharge conveyor 21 and the second discharge conveyor 22 depends on the position of the distribution element 4 and thus can be set in dependence on the desired requirements by moving the distribution element 4 transversely to the direction of transport T.

For the motion of the distribution element 4 transversely to the direction of transport T a motor 12 is hinged to the portal 8. The motor 12 therein acts on a drive belt 13, which converts the rotary motion of the motor 12 into a linear motion of the distribution element 4 transverse to the direction of transport T.

Figure 2:
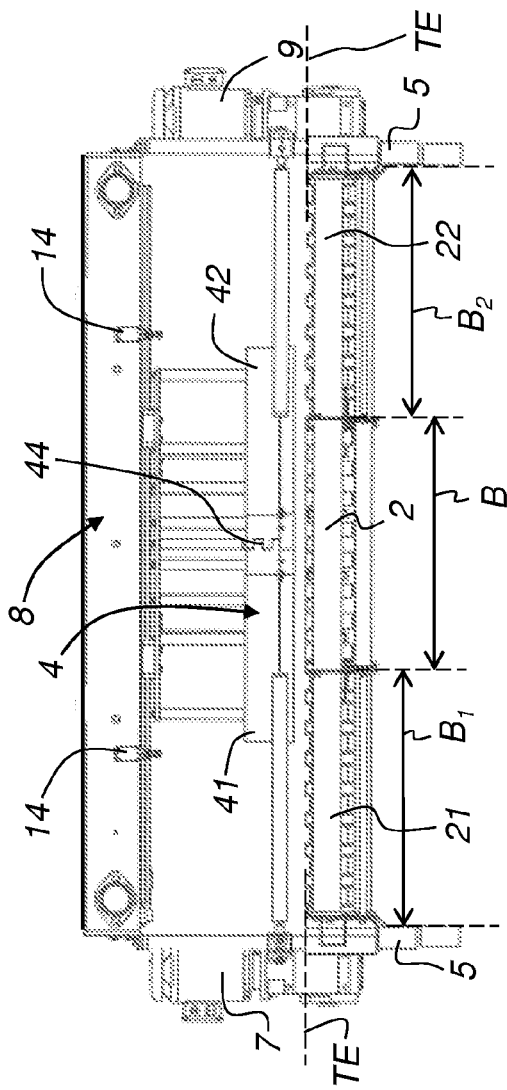
FIG. 2 shows a front view of the apparatus according to the invention for distributing articles within a stream of articles.

FIG. 2 shows a front view of the apparatus 1 according to the invention. The direction of transport T here is directed into the plane of the drawing. The infeed conveyor 2 is located between the first discharge conveyor 21 and the second discharge conveyor 22. The first discharge conveyor has a width B1. The second discharge conveyor 22 has a width B2. The infeed conveyor 2 has a width B. The sum of the width B1 of the first conveyor 21 and of the width B2 of the second discharge conveyor 22 therein is larger than the width B of the infeed conveyor 2. In a preferred embodiment of the invention the sum of the widths B1 and B2 of the first discharge conveyor 21 and of the second discharge conveyor 22 is double the width B of the infeed conveyor 2. As already mentioned in the description of FIG. 1, the first discharge conveyor 21, the infeed conveyor 2 and the second discharge conveyor 22 are placed in a frame. Above the transport plane TE defined by the first discharge conveyor 21, the infeed conveyor 2, and the second discharge conveyor 22 the distribution element 4 is arranged such as to be displaceable transversely to the direction of transport T. The distribution element 4 consists of the first guiding rail 41 and the second guiding rail 42, which are connected to each other such as to form a cone end 44. The cone end 44 therein is directed against the direction of transport T. The cone end 44 can exhibit small rollers in order to facilitate redirecting the articles onto the first discharge conveyor 21 and the second discharge conveyor 22. The distribution element 4 is fixed on a portal 8, on which it can be displaced transversely to the direction of transport T. The portal 8 extends across the entire transport plane TE defined by the conveyors 21, 2, and 22. Laterally on the frame 5 the first motor 7 and the second motor 9 for driving the infeed conveyor 2 are provided. Furthermore end switches 14 are provided at the portal 8, which restrict the range of motion of the distribution element 4 transversely to the direction of transport T.

Figure 3:
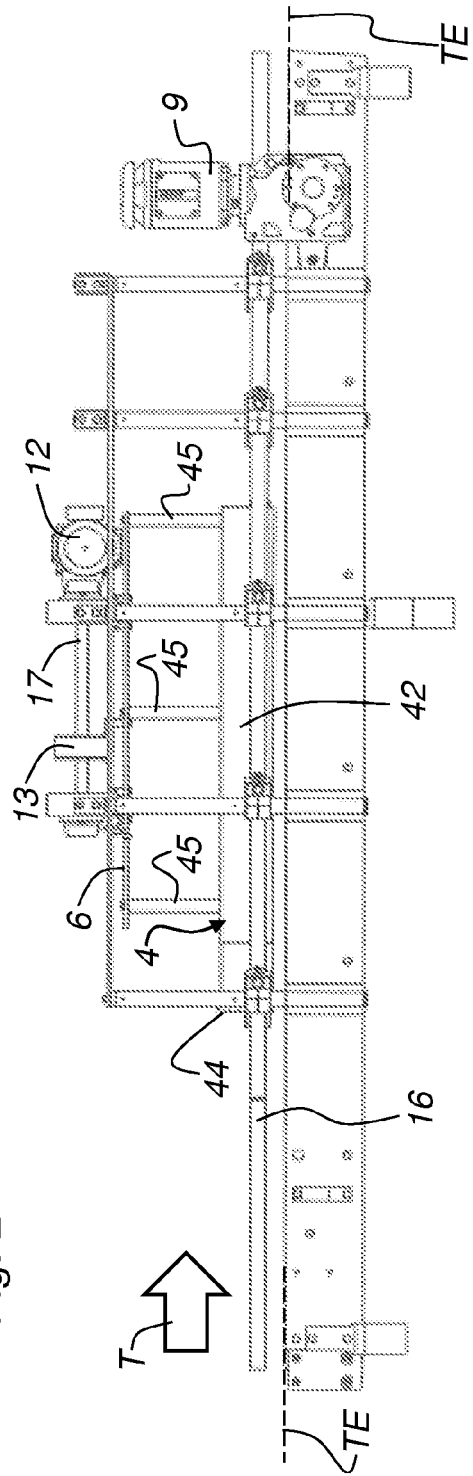
FIG. 3 shows a side view of the apparatus according to the invention for distributing articles within a stream of articles.

FIG. 3 shows a side view of the apparatus according to the invention. Here the cone end 44 of the distribution element 4 is discernible, which is directed against the direction of transport T of the incoming articles. As already mentioned, the distribution element 4 consists of the first guiding rail 41 and of the second guiding rail 42. The distribution element 4 is connected with a platform 6 by means of plural connection elements. A drive belt 13 engages the platform 6, by which the distribution element 4 can be moved transversely to the direction of transport T across the transport plane TE. The motor 12 mounted at the portal transfers the rotary motion by means of a shaft 17 to the drive belt 13. The drive belt 13 advantageously is a toothed belt. It is advantageous, if the motor 12 is a servo drive. A servo drive is capable of recognizing a position moved to and of moving again specifically to this position.

Figure 4:
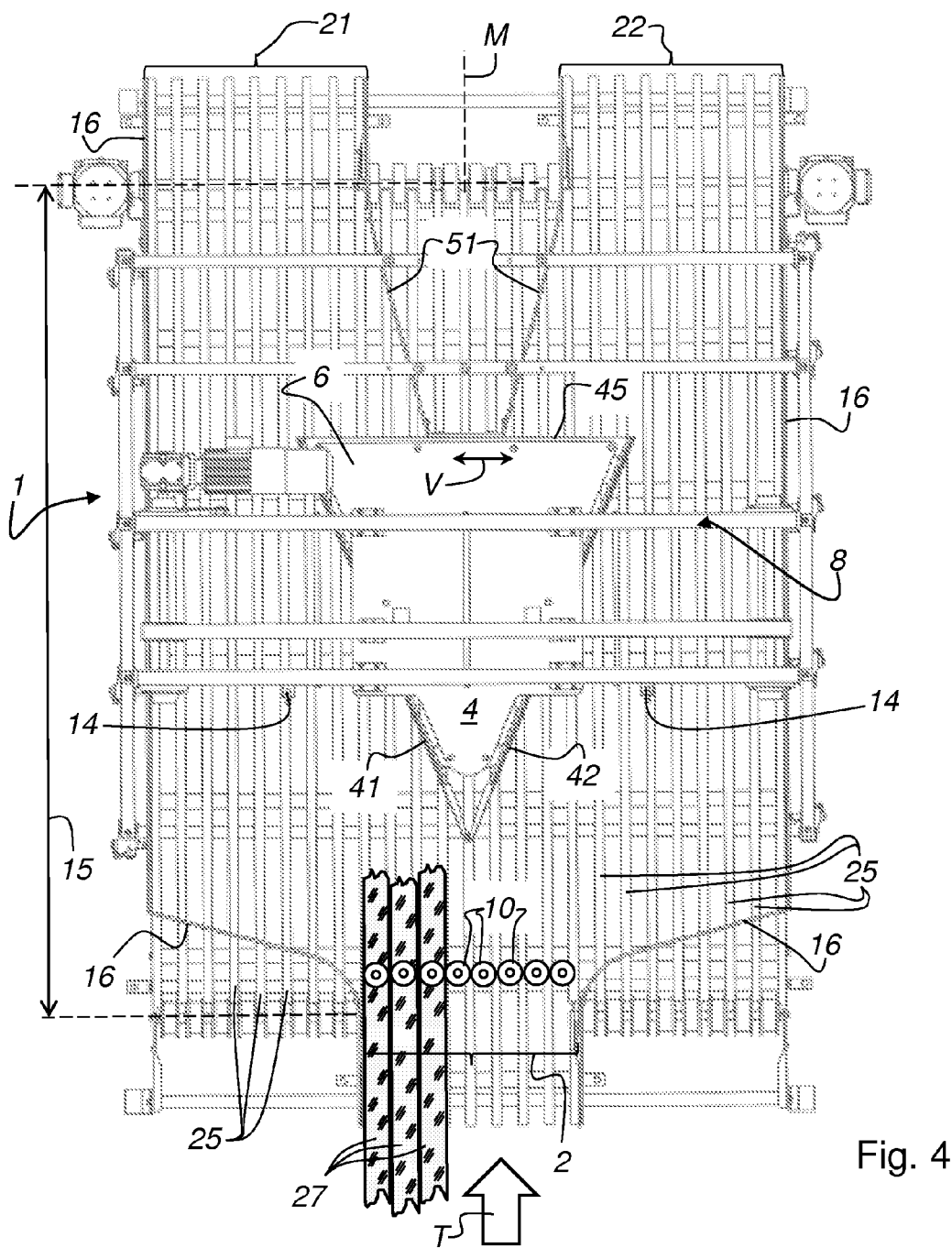
FIG. 4 shows a top view of the apparatus according to the invention for distributing articles, wherein the distribution element is positioned centrally in the infeed conveyor.

FIG. 4 shows a top view of the apparatus 1 according to the invention. The infeed conveyor 2, which exhibits a width B, is located between the first discharge conveyor 21, which has the width B1, and a second discharge conveyor 22, which has the width B2. The arrangement of the infeed conveyor 2 and of the first discharge conveyor 21 and of the second discharge conveyor 22 is such that a region of overlap 15 of the conveyors 2, 21, and 22 is formed. The transport plane TE is bounded by a rail 16 on either side. The rails 16 mainly are provided to avoid that the articles 10 transported fall from the transport plane TE in case of a congestion or a disturbance and thus are damaged. In the representation of FIG. 4 the distribution element 4 is positioned centrally with respect to the infeed conveyor 2. Furthermore the area behind the distribution element 4 also is bounded on either side by a guiding element 51. This guiding element 51 also is provided to avoid that articles enter an area to the side of the discharge conveyors 21 and 22 in the case of a congestion or a disturbance. The portal 8, on which the guiding element 4 is arranged such as to be movable transversely to the direction of transport T, extends across the entire width of the apparatus, which is composed of the width B1 of the first conveyor 21, the width B of the infeed conveyor 2, and the width B2 of the second discharge conveyor 22. In all representations of the apparatus 1 according to the invention the individual conveyors, of which the infeed conveyor 2, the first discharge conveyor 21 and the second discharge conveyor 22 are composed, have been omitted. The individual conveyor sub-belts thus form conveyor lanes, on which the articles are transported through the apparatus 1 according to the invention. The conveyor sub-belts of which a conveyor is composed are supported by support elements 25. Thus the infeed conveyor 2 consists of a plurality of transport lanes $2_1, 2_2, \ldots, 2_n$. Likewise the first discharge conveyor 21 consists of a plurality of transport lanes $21_1, 21_2, \ldots, 21_n$. Likewise also the second discharge conveyor 22 consists of a plurality of transport lanes $22_1, 22_2, \ldots, 22_n$. The conveyor sub-belts 27 of the infeed conveyor 2, as shown in FIG. 4, therein are supported by the support rails 25.

Figure 5:
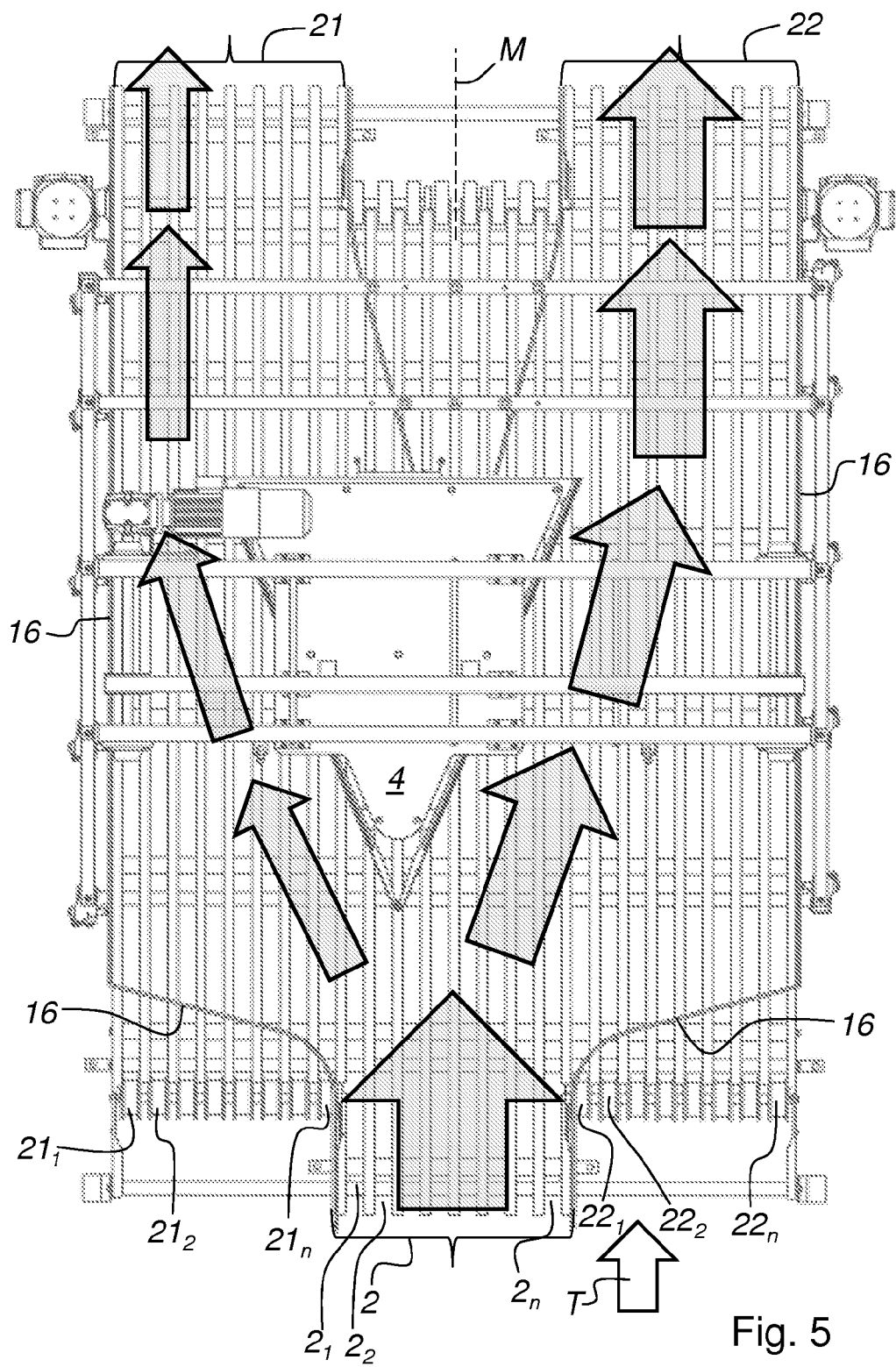
FIG. 5 shows a top view of the apparatus for distributing articles, wherein the distribution element is displaced towards the left with respect to the infeed conveyor.

FIG. 5 shows a top view of the apparatus 1 according to the invention, where the distribution element 4 is positioned outside the center M of the infeed conveyor 2. This positioning is achieved by correspondingly displacing the distribution element 4 by means of the motor 12 across the portal 8 transversely to the direction of transport T. How large a displacement of the distribution element 4 is performed eventually is determined by how the percental distribution of the incoming stream of articles on the infeed conveyor 2 is to be distributed to the first discharge conveyor 21 and the second discharge conveyor 22. If the distribution element 4 is positioned in the center M of the infeed conveyor 2, a percental distribution of 50% of the incoming articles to the first discharge conveyor 21 and 50% of the incoming articles to the second discharge conveyor 22 is achieved. In the representation shown in FIG. 5 a smaller percental portion of the incoming articles is distributed to the first discharge conveyor 21 due to the set position of the distribution element 4.

Figure 6:
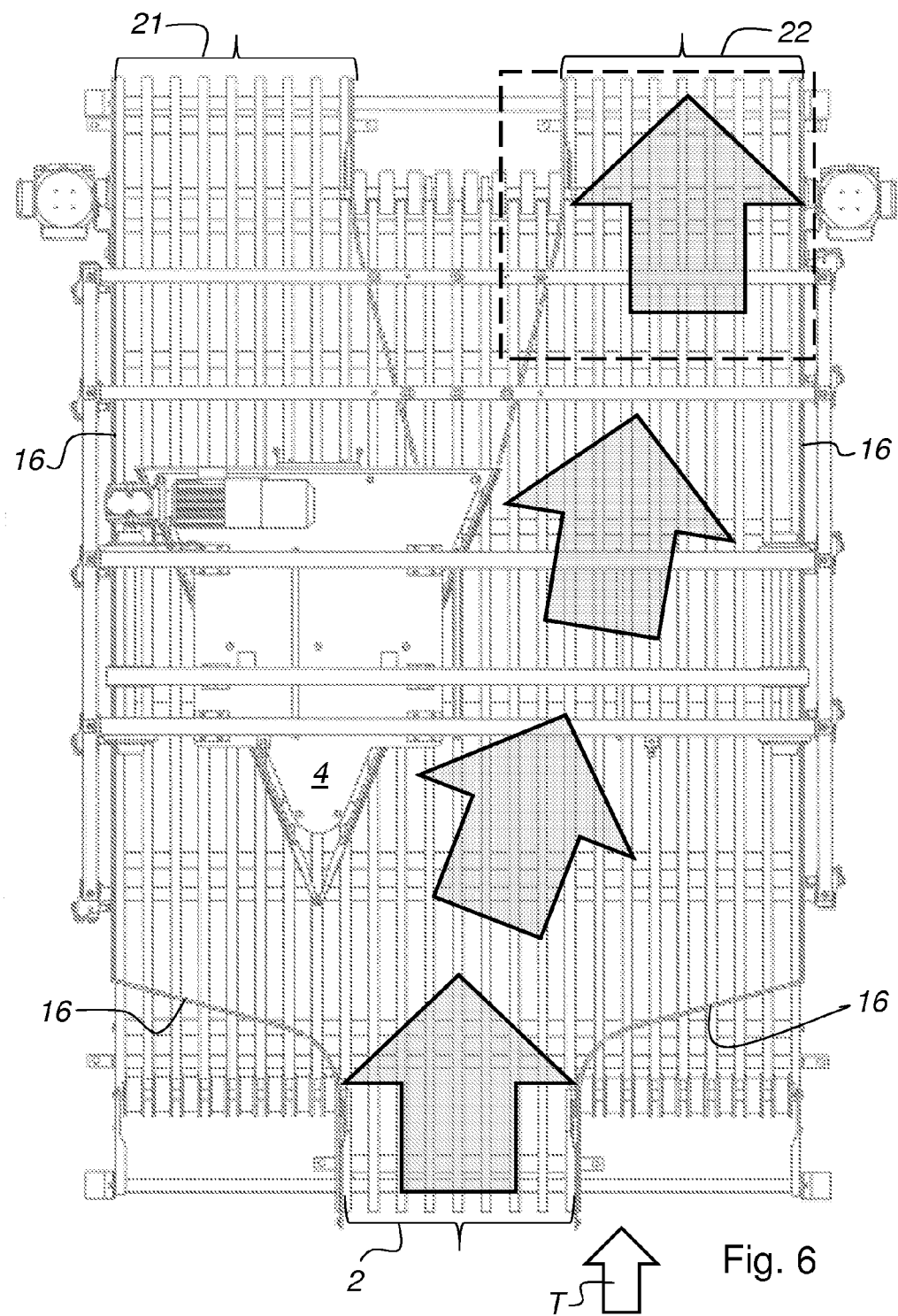
FIG. 6 shows a top view of the apparatus for distributing articles, wherein the distribution element is in contact with the left outer edge of the apparatus.

In the representation of FIG. 6 the distribution element 4 has been moved by such a distance that the cone end 44 of the distribution element 4 is positioned above the transport surface of the first discharge conveyor 21. Preferentially the position of the cone end is over the gap between the conveyor lane $21_n$ and the conveyor lane $21_{n-1}$. Due to this position of the distribution element 4 the articles supplied on the infeed conveyor 2 are redirected onto the second discharge conveyor 22 entirely.

The percental redirection of the stream of articles from the infeed conveyor 2 to the first discharge conveyor 21 and the second discharge conveyor 22 is represented by the width of the branching arrows P1 and P2 in the FIGS. 4, 5, and 6. If, as in FIG. 4, the width of the branching arrows P1 and P2 is identical, this means that 50% of the incoming articles 10 are directed onto the first discharge conveyor 21 and 50% of the incoming articles 10 are directed onto the second discharge conveyor 22 by the distribution element 4.

Figure 7:
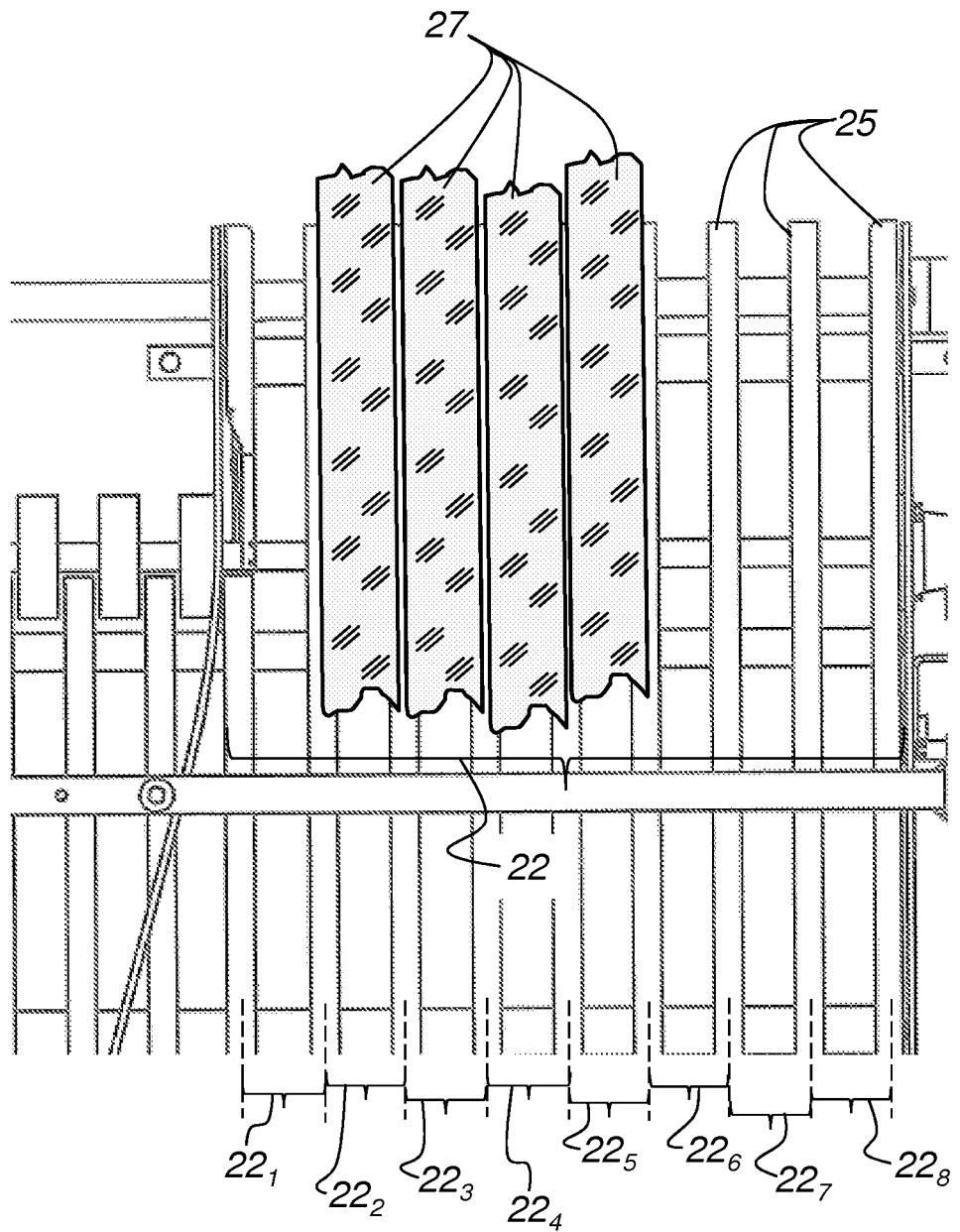
FIG. 7 shows an enlarged view of the area indicated by a dashed rectangle in FIG. 6.

FIG. 7 is an enlarged representation of the area indicated by the dashed rectangle in FIG. 6. The second discharge conveyor 22 consists of eight conveyor lanes $22_1, 22_2, \ldots, 22_8$. The conveyor sub-belts 27 therein are supported by the support rails 25 for the conveyor sub-belts 27.

Figure 8:
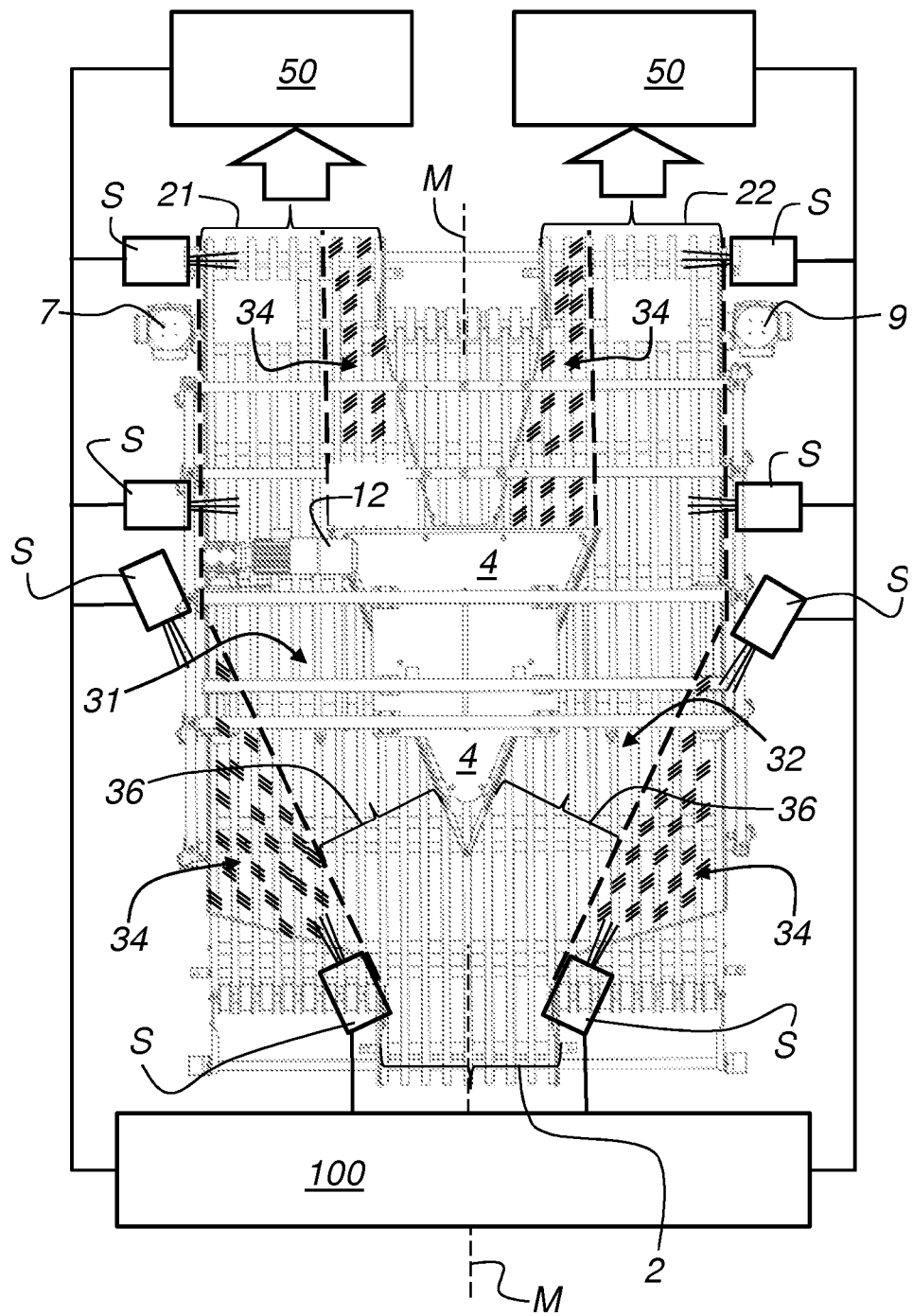
FIG. 8 shows a top view of the apparatus for distributing articles, wherein a plurality of sensors are provided, which serve for monitoring the stream of articles within the apparatus.

FIG. 8 is a schematic top view of the apparatus 1 according to the invention, wherein a plurality of sensors S is provided in order to monitor the state of transport or transport situation, respectively, of the articles 10 on the transport plane TE defined by the infeed conveyor 2, the first discharge conveyor 21 and the second discharge conveyor 22. A machine control 100 is provided, to which the signals determined by the sensors S are transmitted. A processing unit 50 is provided downstream from the first discharge conveyor 21 and from the second discharge conveyor 22, respectively. In the respective processing unit 50 the articles supplied on the conveyors 21 and 22 may for example be packaged. From the respective packaging units 50, also, signals are transmitted to the machine control 100, which together with the signals from the sensors S are processed in a corresponding fashion, in order to eventually control the infeed conveyor 2 and the first discharge conveyor 21 and the second discharge conveyor 22 in such a way that a smooth transport and a smooth distribution of the articles 10 to the two discharge conveyors 21, 22 is possible. The motor 7 and the motor 9, provided on the apparatus for driving the infeed conveyor 2, are also connected with the machine control 100. Parallely, also the motor 12, by which the distribution element 4 can be displaced transversely to the direction of transport T across the transport plane TE, is connected with the machine control 100. Depending on need and requirements for the distribution of articles 10 from the infeed conveyor 2 to the first discharge conveyor 21 and the second discharge conveyor 22, the machine control can react accordingly and act on the various control elements (motors 7, 9, and 12), in order to assure a smooth and automatic operation of the apparatus 1. According to a possible embodiment the infeed conveyor 2 may be driven up to the center M by the first motor 7 at a velocity different from the velocity at which the other half of the infeed conveyor 2, which may be driven by the motor 9, is driven.

As already mentioned, the articles supplied on the infeed conveyor may be transferred to a first transport area 31 on the first discharge conveyor 21 and to a second transport area 32 of the second discharge conveyor 22, in dependence on the position of the distribution element 4. As the distribution element 4 is positioned with its cone end in the center M of the infeed conveyor 22, the widths 36 of the first transport area 31 and of the second transport area 32 are equal. Thus here there is a 50:50 distribution of the articles 10 supplied on the first conveyor 2 to the first discharge conveyor 21 and to the second discharge conveyor 22.

In the region of overlap 15 between the infeed conveyor 2 and the two discharge conveyors 21 and 22 areas 34 free of articles form essentially next to the distribution element 4 and in the direction of transport T behind the distribution element 4. Thus it is possible to monitor these areas 34 free of articles with the sensors S. Should articles be present in the areas 34 free of articles this indicates a disturbance of the downstream processing unit 50 or a disturbance within the discharge conveyors 21 and 22. If the sensors S detect articles 10 in the areas free of articles, a signal is sent to the machine control 100, in order that it is possible to suitably step in in the transport of articles within the apparatus 1. One possible step is to displace the distribution element 4 in a suitable fashion in such a way that the disturbance registered with the machine control 100 is removed. Likewise the infeed velocity of the articles on the infeed conveyor 2 can be reduced by the motor 7 and/or the motor 9 in a suitable fashion. A complete stop of the infeed conveyor 2 is also conceivable.

Also, the sensors S can be used for monitoring free areas, in order that the distribution element 4 is only then moved in the desired direction, if the sensors S do not detect any articles 10, such that an unobstructed positioning is possible.

Figure 9:
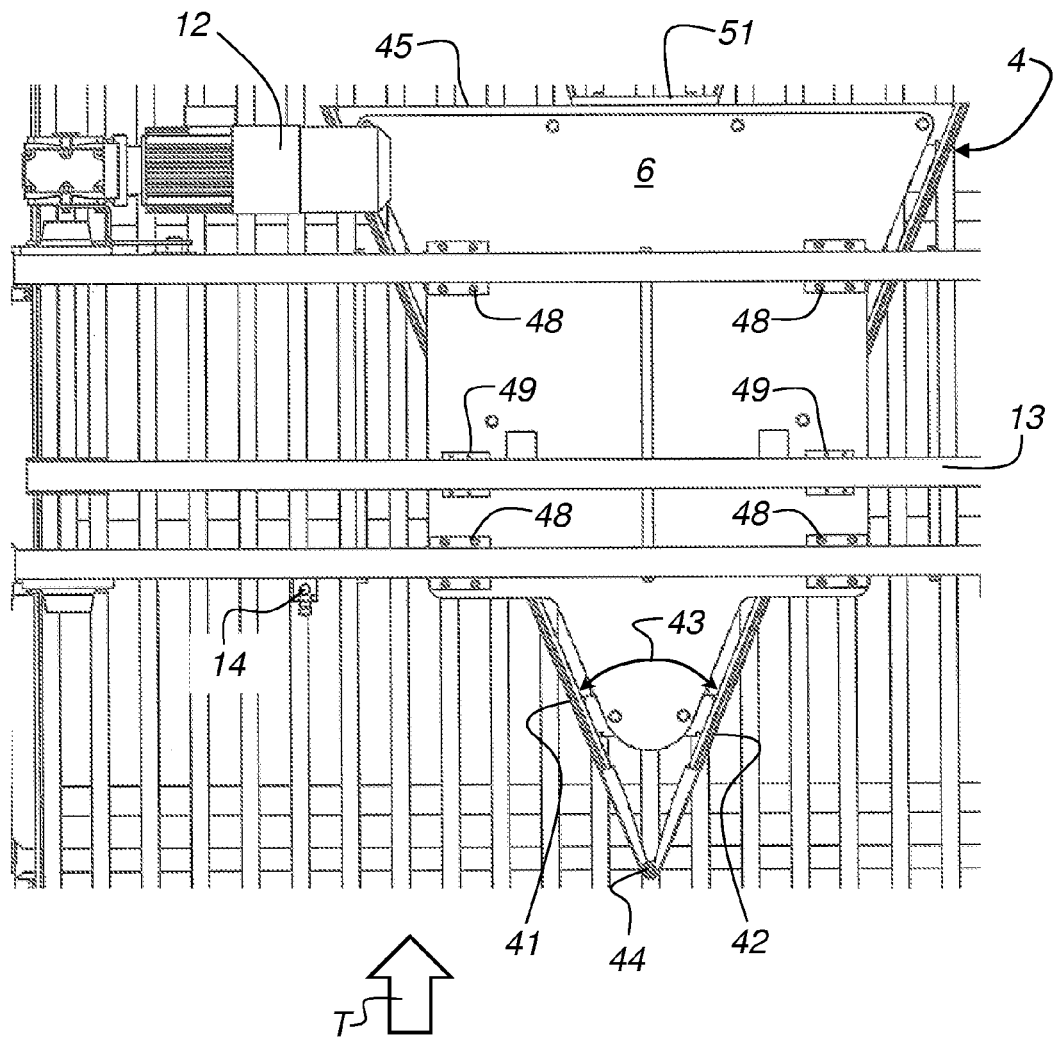
FIG. 9 shows an enlarged view of the distribution element, which is positioned over the conveyors and movable.

FIG. 9 shows a detailed top view of the distribution element 4, which can be displaced transversely to the direction of transport T over the transport plane TE, in order to suitably redirect the incoming articles 10 to the first discharge conveyor 21 and to the second discharge conveyor 22, respectively. As already mentioned, the distribution element 4 consists of a first guiding element 41 and a second guiding element 42. The first guiding element 41 and the second guiding element 42 are arranged at an acute angle 43 with respect to each other and thus form a cone end 44. This cone end 44 is directed against the direction of transport T of the articles. At the side of the distribution element 4 opposite the cone end 44 a base 45 is provided, which connects the first guiding element 41 with the second guiding element 42. The distribution element 4 is fixed to a platform 6. The platform 6 exhibits plural linear guides 48, which cooperate with corresponding elements of the portal 8. By means of the linear guides 48 it thus is possible to displace the distribution element 4 in a rectilinear fashion transversely to the direction of transport T. The motion of the distribution element 4 is effected by a motor 12 which acts on a drive belt 13, connected to the platform 6 by two linkages 49. Thus the rotary motion of the motor 12 can be converted into a linear motion of the distribution element 4. In a particularly preferred embodiment the motor 12 is a servo drive. The base 45 of the distribution element 4 is supported on a guiding element 51. Through this support the pressure of the incoming articles on the distribution element 4 can be compensated, and thus the possibility of the distribution element 4 getting wedged during its movement along the linear guides 48 is avoided.

Figure 10:
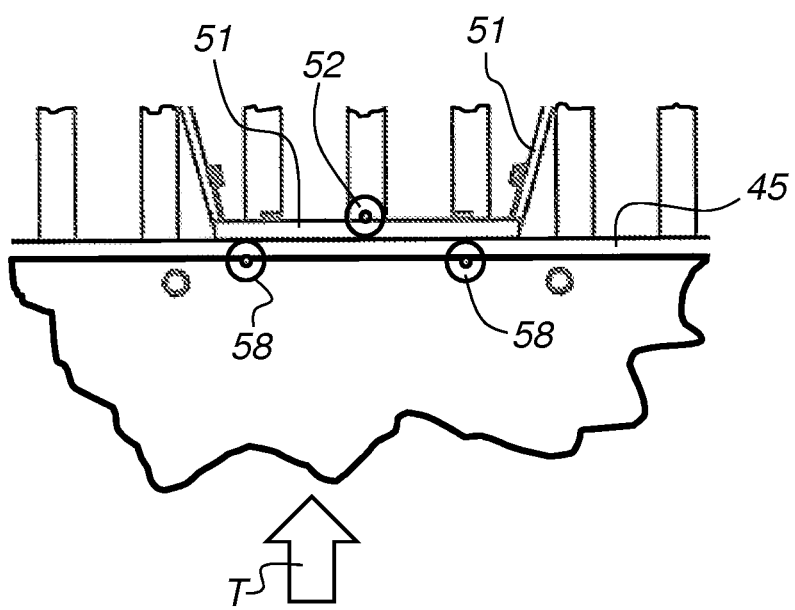
FIG. 10 shows an enlarged view of the part of the distribution element, which is supported on a guiding element for stability.

FIG. 10 shows an enlarged representation of the region of the base 45 and of the guiding element 51, in which the distribution element 4 is supported on the guiding element. The guiding element 51 exhibits one or plural rollers 52 on the side facing the base 45. Likewise the base 45 can exhibit at least one roller 58, which cooperates with the guiding element 51. Through this cooperation of the various rollers 52 and 58 a friction reduced support of the distribution element 4 during its linear motion transversely to the direction of transport T is achieved. Likewise, instead of the rollers 52, 58 sliding elements or linear guides (not shown) may be used, which provide for a friction reduced displacement and nonetheless maintain the supporting effect.

Figure 11:
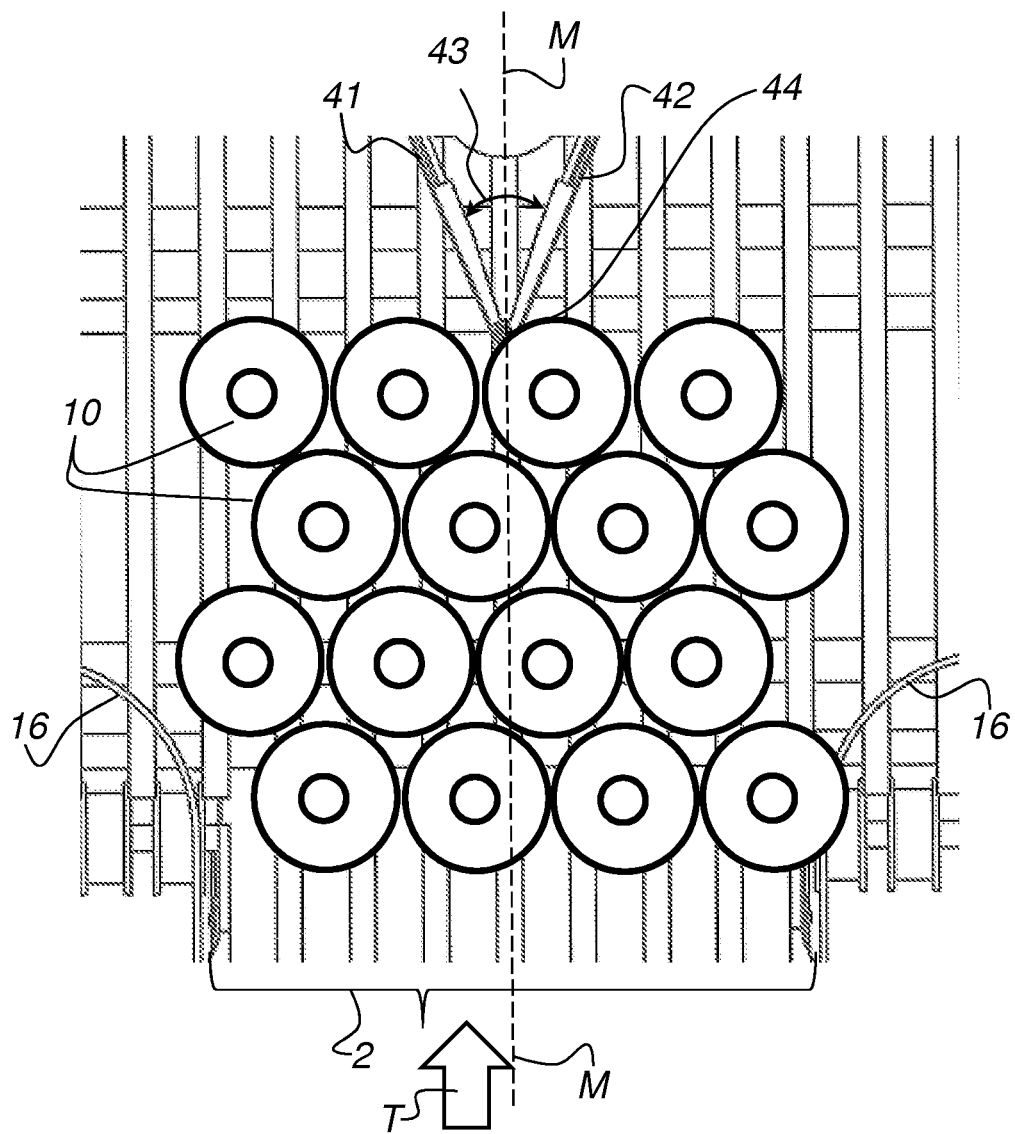
FIG. 11 shows an enlarged view of the articles arranged on the infeed conveyor, which make contact with the cone end of the distribution element.

FIG. 11 shows the supply of a plurality of articles 10 on the infeed conveyor 2. Therein the articles 10 make contact in the direction of transport T with the cone end 44 of the distribution element 4. As already mentioned several times, the cone end 44 is formed by the first guiding element 41 and the second guiding element 42, which are arranged at an acute angle 43 to each other. The articles 10 supplied in the direction of transport T on the infeed conveyor 2 also are still partially guided on either side by the rails 16. The distribution element 4 therein is positioned in such a way with respect to the articles 10 supplied with the infeed conveyor 2 that the cone end 44 of the distribution element 4 makes contact with the articles essentially between two articles 10, and thus distributes them smoothly to the first discharge conveyor 21 or the second discharge conveyor 22, respectively.

Figure 12:
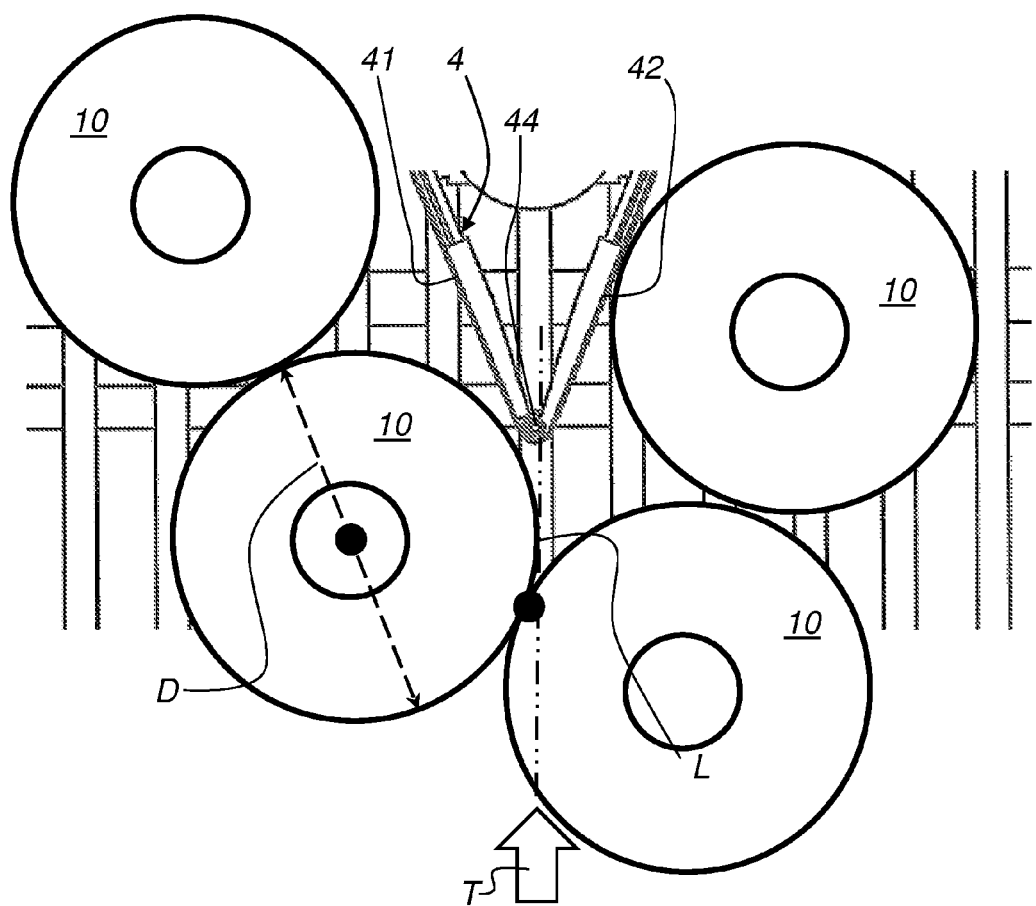
FIG. 12 shows an enlarged representation of the cooperation of the articles supplied on the infeed conveyor and the distribution element, and their distribution onto the discharge conveyors.

FIG. 12 is an enlarged representation of the effect of the distribution element 4 while dividing the stream of articles onto the first discharge conveyor 21 and onto the second discharge conveyor 22. The distribution element 4 should always be positioned in such a way with respect to the incoming articles 10 that the cone end formed by the distribution element 4 and the first guiding rail 41 and the second guiding rail 42 is positioned in such a way that the cone end 44 is directed essentially at a line L, at which two neighboring articles 10 touch each other with their effective diameters D. If, for example, the incoming articles 10 were to hit the cone end 44 directly, no components of motion transverse to the direction of transport T would be imparted to the articles by the distribution element 4. Thus there is always the danger of a congestion forming, or that the distribution of the incoming articles 10 to the first discharge conveyor 21 and to the second discharge conveyor 22 does not happen in the desired smooth fashion. Thus there is always the condition of directing or positioning, respectively, the distribution element 4 in such a way with respect to the incoming stream of articles, that the articles 10, which are distributed to the discharge conveyors 21 and 22 by the distribution element 4, always receive a component of motion transverse to the direction of transport T.

The displacement of the distribution element 4 transverse to the direction of motion T thus also takes into account a possible difference in performance of the processing unit 50 located downstream from the first discharge conveyor 21 and from the second discharge conveyor 22. By the distribution element 4 the stream of articles thus can be distributed between the processing units 50 purposefully and adapted to performance.

The invention has been described with reference to a preferred embodiment. However, it is obvious to a person skilled in the art, that alterations and modifications of the invention can be made without leaving the scope of the subsequent claims. In particular the mirrored embodiments are also within the scope of the subsequent claims.

What is claimed is:

1. Apparatus for distributing articles within a stream of articles in a direction of transport, comprising:
an infeed conveyor exhibiting plural conveyor lanes;
a first discharge conveyor and a second discharge conveyor, each exhibiting plural conveyor lanes, wherein the first discharge conveyor, the infeed conveyor and the second discharge conveyor define a transport plane;
a region of overlap is formed by the arrangement of the infeed conveyor and the first and second discharge conveyor in the direction of transport; and
a distribution element is displaceable essentially transverse to the direction of transport, so that a stream of incoming and neighboring articles on the transport plane is distributed onto the first discharge conveyor and the second discharge conveyor, in the direction of transport; wherein the distribution element is formed by a first guiding rail and a second guiding rail arranged at an acute angle with respect to each other and thus forming a cone shaped end directed opposite the direction of transport.

2. The apparatus of claim 1, wherein the first guiding rail and the second guiding rail are connected with each other by a base, which is supported in the direction of transport by a guiding element downstream the direction of transport and supported transverse to the direction of transport in a friction-reduced manner.

3. The apparatus of claim 2, wherein the base and the guiding element each are supported by plural rollers or sliding elements transverse to the direction of transport in a friction reduced fashion.

4. The apparatus of claim 1, wherein the distribution element is connected with a platform, which is mounted to a portal extending transversely over the region of overlap of the incoming conveyor and the first and second discharge conveyor.

5. The apparatus of claim 4, wherein an individually controllable motor is provided to the portal, wherein the controllable motor acts on a drive belt, which mounted to the platform linearly guided on the portal.

6. The apparatus of claim 5, wherein the portal exhibits two end switches, by which a displacement range of the distribution element transverse to the direction of transport is bounded.

7. The apparatus of claim 1, wherein a sum of a first width of the first discharge conveyor and a second width of the second discharge conveyor is larger than a width of the infeed conveyor.

8. The apparatus of claim 7, wherein the width of the first discharge conveyor and the width of the second discharge conveyor and the width of the infeed conveyor are equal.

9. The apparatus of claim 1, wherein a machine control is provided, which in dependence on the articles to be processed with the apparatus and on the percental distribution of the articles onto the first and second discharge conveyor displaces the distribution element in such a way transverse to the direction of transport that the cone end formed by the first and second guiding rail essentially points at a line, at which two articles touch each other with their respective effective diameters.

10. Method for distributing articles within a stream of articles, comprising the steps of:
supplying neighboring articles in a direction of transport by an infeed conveyor; and
distributing the neighboring articles onto a first discharge conveyor and a second discharge conveyor, by displacing a distribution element transversely to the direction of transport of the articles, wherein the distribution element has a first guiding rail and a second guiding rail, which are arranged at an acute angle with respect to each other and thus form a cone end directed opposite the direction of transport of the articles, wherein the distribution element is displaced in such a way with respect to the incoming articles that the cone end is directed essentially at a line, at which two neighboring articles touch each other with their effective diameter;
wherein the first discharge conveyor, the infeed conveyor and the second discharge conveyor define a transport plane and the neighboring articles are distributed onto the first and second discharge conveyors according to a predefined percental ratio.

11. The method of claim 10, wherein the neighboring articles transported by the infeed conveyor are transferred to a first transport area of the first discharge conveyor and to a second transport area of the second conveyor by means of the distribution element.

12. The method of claim 11, wherein, in dependence on the position of the distribution element, in a region of overlap of the infeed conveyor and of the two discharge conveyors areas free of articles are formed essentially next to the distribution element and in the direction of transport after the distribution element.

13. The method of claim 10, wherein signals are transmitted to a machine control from a first processing unit, located downstream of the first discharge conveyor, and from a second processing unit, located downstream of the second discharge conveyor, and that the infeed conveyor, the first discharge conveyor and the second discharge conveyor are monitored by plural sensors with respect to the transport situation of the articles, and corresponding signals are sent to the machine control.

14. The method of claim 13, wherein areas free of articles are monitored by the plural sensors with regard to whether there are articles in the areas and that, if articles are detected in the areas free of articles, a warning signal is set or the machine control steps in in such a way in the apparatus that the warning signal can be lifted by a suitable displacement of the distribution element and/or a velocity control of the incoming conveyor and/or of the two discharge conveyors.

* * * * *